United States Patent
Raviv

[11] Patent Number: 5,097,267
[45] Date of Patent: Mar. 17, 1992

[54] AIRBORNE EARLY WARNING RADAR SYSTEM

[75] Inventor: Dov Raviv, Bat Yam, Israel

[73] Assignee: Israel Aircraft Industries Ltd., Lod, Israel

[21] Appl. No.: 613,261

[22] Filed: Nov. 14, 1990

[30] Foreign Application Priority Data

Nov. 16, 1989 [IL] Israel ............................... 92325

[51] Int. Cl.⁵ .................... G01S 13/86; H01Q 1/28
[52] U.S. Cl. .................... 342/58; 342/368; 343/708; 244/3.14
[58] Field of Search .............. 342/58, 60, 368, 158, 342/75; 244/3.11, 3.14; 343/705, 708

[56] References Cited

U.S. PATENT DOCUMENTS

| | | | |
|---|---|---|---|
| 2,995,740 | 8/1961 | Shreckengost | 342/58 |
| 3,742,495 | 6/1973 | Diamantides | 342/58 X |
| 3,778,007 | 12/1973 | Kearney, II et al. | 244/3.14 |
| 3,806,928 | 4/1974 | Costanza | 342/4 |
| 3,906,308 | 9/1975 | Amason et al. | 244/1 A X |
| 3,943,357 | 3/1976 | Culver | 244/175 |
| 3,953,857 | 4/1976 | Jenks | 343/705 |
| 4,336,543 | 6/1982 | Ganz et al. | 342/371 X |
| 4,779,097 | 10/1988 | Morchin | 342/368 |
| 4,922,257 | 5/1990 | Saito et al. | 342/368 X |

Primary Examiner—Gilberto Barron, Jr.
Attorney, Agent, or Firm—David L. Davis

[57] ABSTRACT

An airborne early warning radar system comprising an automatically controlled pilotless aircraft, a phased array radar antenna disposed in the pilotless aircraft and apparatus for selectably varying the orientation of the phased array radar antenna relative to the aircraft.

26 Claims, 3 Drawing Sheets

AIRBORNE EARLY WARNING RADAR SYSTEM

FIELD OF THE INVENTION

The present invention relates to airborne radar generally.

BACKGROUND OF THE INVENTION

Various types of airborne radar platforms are known in the art. The state of the art relating to airborne early warning radars is reviewed in an article entitled "Airborne early warning" by Dan Boyle, International Defense Review 1/1989 pp. 43-46.

Well known airborne early warning radar systems for manned aircraft are the AWACS and HAWKEYE, both of which employ specially designed airframes and are relatively expensive.

SUMMARY OF THE INVENTION

The present invention seeks to provide a relatively low-cost airborne early warning radar system suitable for UAVs (unmanned air vehicles).

There is thus provided in accordance with a preferred embodiment of the present invention an airborne early warning radar system comprising an automatically controlled pilotless aircraft, a phased array radar antenna disposed in the pilotless aircraft and apparatus for selectably varying the orientation of the phased array radar antenna relative to the aircraft.

In accordance with a preferred embodiment of the present invention, the phased array radar antenna extends along most of the length and height of the fuselage of the aircraft.

Additionally, in accordance with a preferred embodiment of the invention, an internal algorithm or a radio command is operative to monitor and select the operational mode of the system. The apparatus for selectably varying is operative to orient the phased array radar antenna in either a right-facing or left-facing orientation, depending on the direction of travel of the aircraft.

Further, in accordance with a preferred embodiment of the present invention, at least a portion of the aircraft is formed of a radar signal transparent material capable of bearing the mechanical stress brought to bear thereupon. This material preferably includes a honeycomb sandwich comprising a glass/epoxy skin and a Nomex honeycomb core.

BRIEF DESCRIPTION OF THE DRAWINGS

The present invention will be understood and appreciated more fully from the following detailed description, taken in conjunction with the drawings in which.

DETAILED DESCRIPTION

Figure 1:
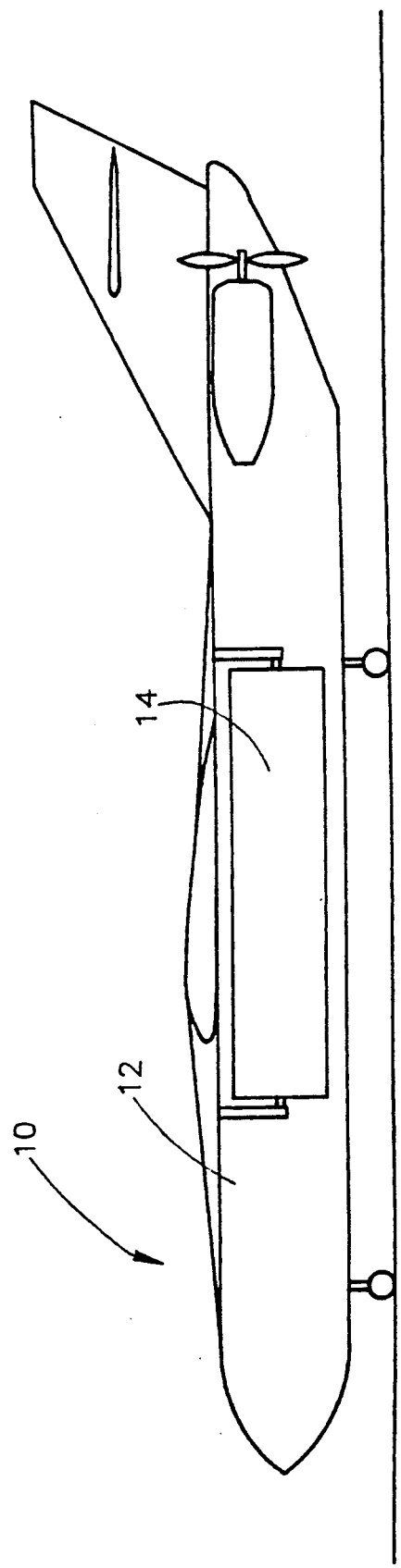
FIG. 1 is a partially cut away side view illustration of an airborne early warning radar system constructed and operative in accordance with a preferred embodiment of the present invention.
Figure 2:
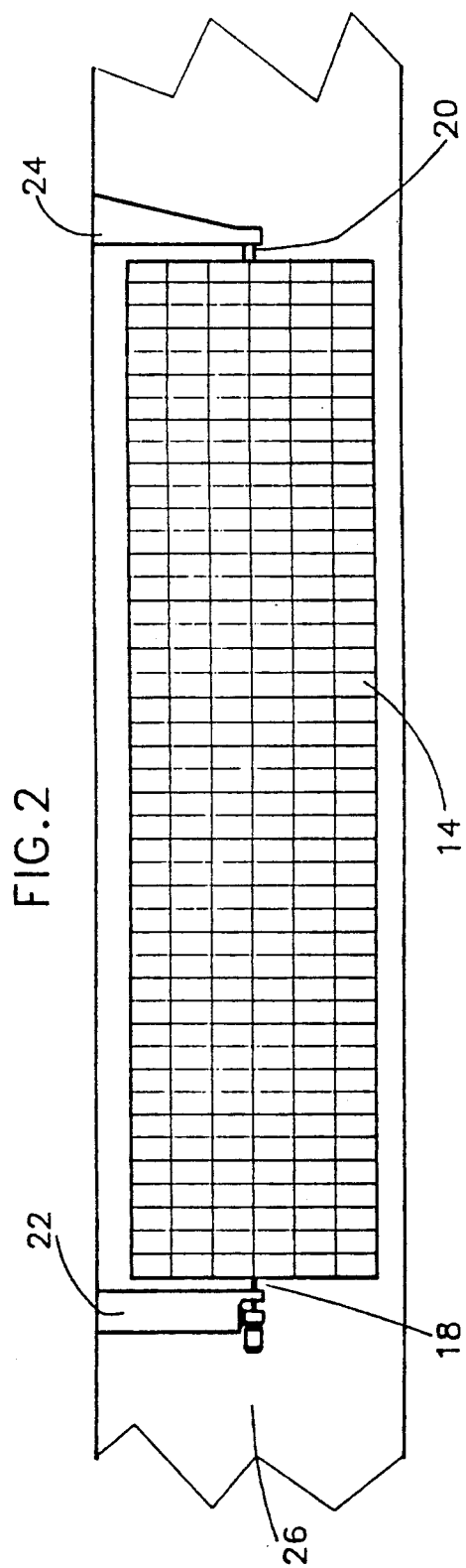
FIG. 2 is a detailed illustration of the mounting of a phased array radar antenna in the fuselage of an aircraft in accordance with a preferred embodiment of the present invention.
Figure 4:
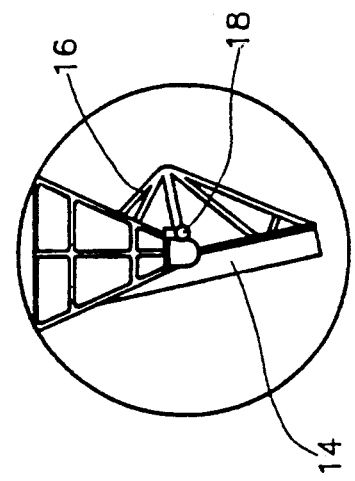
FIG. 4 is an end view illustration of the mounting of the phased array radar antenna.
Figure 3:
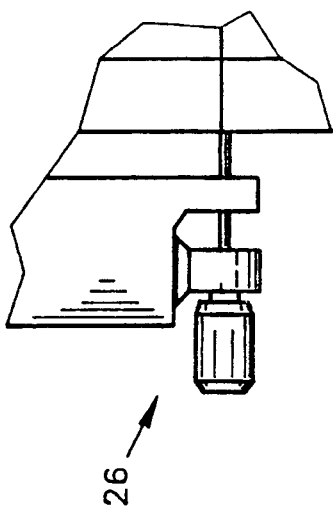
FIG. 3 is an enlarged illustration of part of apparatus for varying the orientation of the phased array radar antenna in accordance with a preferred embodiment of the invention.

Reference is now made to FIGS. 1-5 which illustrate an airborne early warning radar system constructed and operative in accordance with a preferred embodiment of the present invention.

Preferably, the airborne early warning radar system comprises an unmanned aircraft 10, of the type commercially available from Maslat of Israel Aircraft Industries, or a scaled up model thereof. Mounted in the fuselage 12 of the aircraft is a phased array radar antenna 14, of conventional construction, of the type which is commercially available from Elta Electronics Industries of Israel under the tradename Phalcon.

The phased array radar antenna 14 is provided with a suitable mounting structure 16 including a pair of mounting axles 18 and 20, which are supported on fuselage mounting supports 22 and 24. Associated with at least one of mounting axles 18 and 20 and with a corresponding mounting support is a motor and drive assembly 26 which is operative in response to appropriate control signals, to rotate the mounting axle relative to the mounting support and thus change the orientation of the phased array antenna 14 with respect to the fuselage.

Normally the phased array antenna 14 is disposed generally facing downwardly, typically 12 degrees from the vertical. Depending on the directional relationship between the direction of travel of the aircraft 10 and the region to be monitored, the orientation of the antenna 14 may be shifted 156 degrees by the apparatus described above so that the antenna 14 faces in a desired direction (either "left" or "right").

Figure 5:
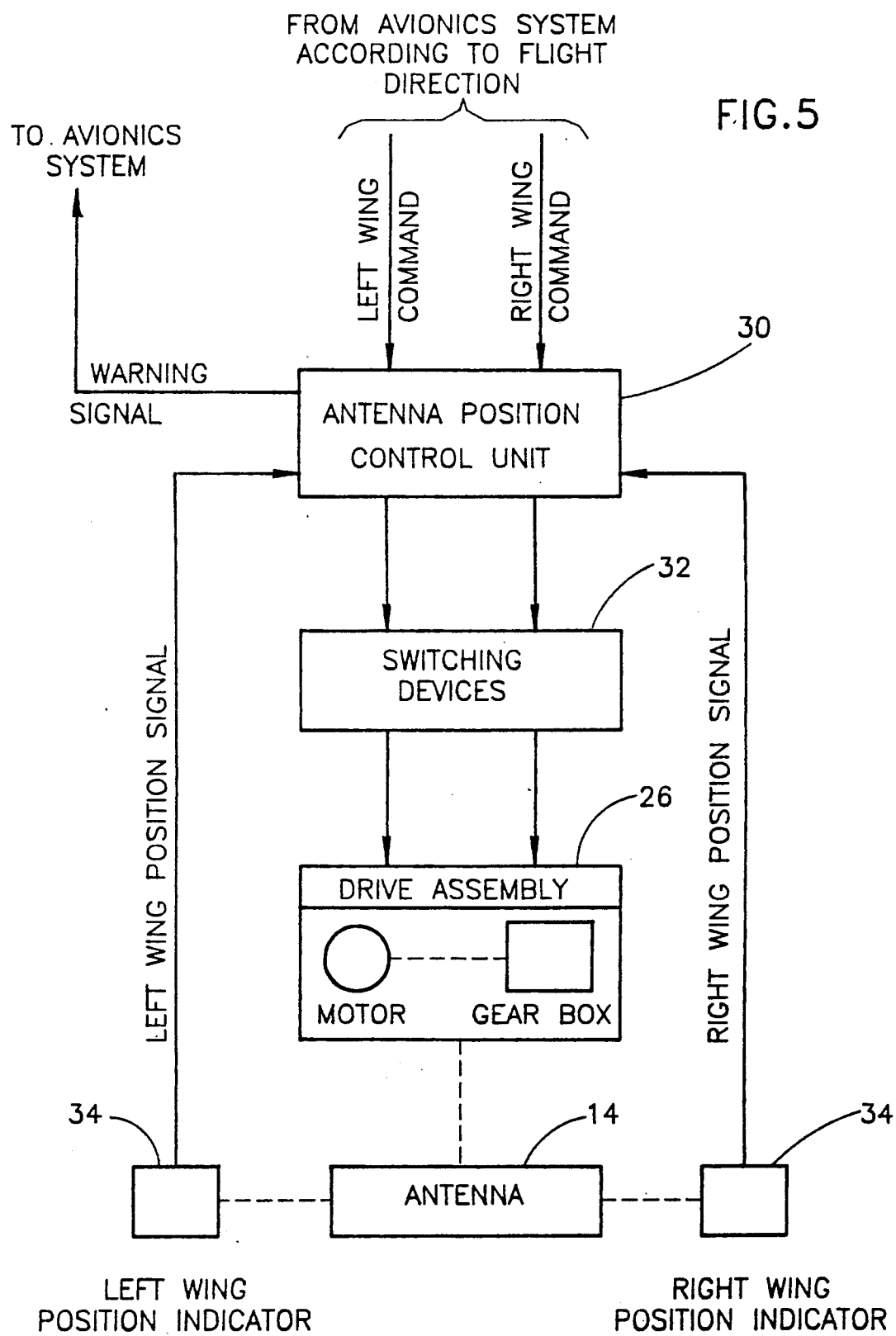
FIG. 5 is a simplified block diagram of apparatus for operation and control of apparatus for determining the direction of the radar antenna in accordance with the present invention.

Reference is now made to FIG. 5, which illustrates apparatus for governing the orientation of the antenna. The apparatus of FIG. 5 includes an antenna position control unit 30, such as the units commercially available from MLM of Israel Aircraft Industries, which receives "left" or "right" antenna direction signals from the aircraft avionics system and which is operative to warn the avionics system of discrepancies between the direction signals and the actual position of the antenna.

The antenna position control unit 30 provides an output to switching devices 32, which may comprise standard off the shelf electrical contactors. The switching devices 32 control the operation of drive assembly 26 (FIG. 2), which in turn position the antenna 14 as necessary. The actual position of antenna 14 is monitored by Left and Right antenna position indicators 34 and 36 which provide outputs to control unit 30.

The radar system of the present invention may communicate with the aircraft avionics via commercially available communication links, such as set forth in MIL STD 1553B. Communication between the avionics, and ground control may be provided via up-link and down-link units, such as those commercially available from Elta Electronics Industries Ltd. of Ashdod, Israel, under their model number EL/K-1850.

The body of the fuselage 12, particularly alongside the antenna 14 is preferably formed of a material comprising a radar signal transparent material, such as a honeycomb formed of a plastic or other material. Preferably, the radar transparent material is also capable of bearing mechanical stress. A preferred material is a honeycomb sandwich comprising glass/epoxy skins and a Nomex honeycomb core, and is manufactured by Israel Aircraft Industries. The special characteristics of this material allow the antenna to be installed substantially interiorly of the aircraft.

It will be appreciated by persons skilled in the art that the present invention is not limited by what has been particularly shown and described hereinabove. Rather the scope of the present invention is defined only by the claims which follow.

I claim:

1. An airborne early warning radar system comprising a pilotless aircraft, a phased array radar antenna disposed in the fuselage of the pilotless aircraft and means for selectably varying the mechanical orientation of the phased array radar antenna relative to the aircraft wherein said phased array radar antenna extends along most of the length and height of the fuselage of the aircraft.

2. An airborne early warning radar system according to claim 1 wherein at least a portion of the fuselage of the aircraft is formed of a radar signal transparent material capable of bearing the mechanical stress brought to bear thereupon.

3. An airborne early warning radar system according to claim 2 wherein said radar signal transparent material comprises a honeycomb sandwich comprising a glass/epoxy skin and a Nomex honeycomb core.

4. An airborne early warning radar system according to claim 1 further comprising radio control means for controlling the operation of the means for selectably varying.

5. An airborne early warning radar system according to claim 4 wherein said means for selectably varying is operative to position said antenna in a position corresponding to either a Right, Left or Downward looking orientation.

6. An airborne early warning radar system according to claim 5 wherein at least a portion of the fuselage of the aircraft is formed of a radar signal transparent material capable of bearing the mechanical stress brought to bear thereupon.

7. An airborne early warning radar system according to claim 6 wherein said radar signal transparent material comprises a honeycomb sandwich comprising a glass/epoxy skin and a Nomex honeycomb core.

8. An airborne early warning radar system according to claim 4 wherein at least a portion of the fuselage of the aircraft is formed of a radar signal transparent material capable of bearing the mechanical stress brought to bear thereupon.

9. An airborne early warning radar system according to claim 8 wherein said radar signal transparent material comprises a honeycomb sandwich comprising a glass/epoxy skin and a Nomex honeycomb core.

10. An airborne warning radar system according to claim 1 wherein said means for selectably varying is operative to position said antenna in a position corresponding to either a Right, Left or Downward looking orientation.

11. An airborne early warning radar system according to claim 10 wherein at least a portion of the fuselage of the aircraft is formed of a radar signal transparent material capable of bearing the mechanical stress brought to bear thereupon.

12. An airborne early warning radar system according to claim 11 wherein said radar signal transparent material comprises a honeycomb sandwich comprising a glass/epoxy skin and a Nomex honeycomb core.

13. An airborne early warning radar system according to claim 2 further comprising radio control means for controlling the operation of the means for selectably varying.

14. An airborne early warning radar system according to claim 13 wherein said means for selectably varying is operative to position said antenna in a position corresponding to either a Right, Left or Downward looking orientation.

15. An airborne early warning radar system according to claim 14 wherein at least a portion of the fuselage of the aircraft is formed of a radar signal transparent material capable of bearing the mechanical stress brought to bear thereupon.

16. An airborne early warning system according to claim 15 wherein said radar signal transparent material comprises a honeycomb sandwich comprising a glass/epoxy skin and a Nomex honeycomb core.

17. An airborne early warning radar system according to claim 13 wherein at least a portion of the fuselage of the aircraft is formed of a radar signal transparent material capable of bearing the mechanical stress brought to bear thereupon.

18. An airborne early warning radar system according to claim 17 wherein said radar signal transparent material comprises a honeycomb sandwich comprising a glass/epoxy skin and a Nomex honeycomb core.

19. An airborne early warning radar system according to claim 2 wherein said means for selectably varying is operative to position said antenna in a position corresponding to either a Right, Left or Downward looking orientation.

20. An airborne early warning radar system according to claim 19 wherein at least a portion of the fuselage of the aircraft is formed of a radar signal transparent material capable of bearing the mechanical stress brought to bear thereupon.

21. An airborne early warning radar system according to claim 20 wherein said radar signal transparent material comprises a honeycomb sandwich comprising a glass/epoxy skin and a Nomex honeycomb core.

22. An airborne early warning radar system according to claim 1 wherein at least a portion of the fuselage of the aircraft is formed of a radar signal transparent material capable of bearing the mechanical stress brought to bear thereupon.

23. An airborne early warning radar system according to claim 22 wherein said radar signal transparent material comprises a honeycomb sandwich comprising a glass/epoxy skin and a Nomex honeycomb core.

24. An airborne radar system comprising:
   a pilotless winged aircraft, at least a section of the central section portion of the fuselage of which is formed of radar transparent material;
   a phased array antenna disposed in the central section; and
   rotation means for rotating said phased array antenna about an axis of rotation.

25. A system according to claim 24 wherein said phased array antenna extends along most of the height and length of the fuselage.

26. A system according to claim 24 where said axis of rotation is generally along the axis of the fuselage whereby said phased array may be positioned in a position corresponding to a Right, Left or Downward looking position.

* * * * *